US012609811B2

(12) United States Patent
Tsirkin et al.

(10) Patent No.: US 12,609,811 B2
(45) Date of Patent: Apr. 21, 2026

(54) SECURED PERIPHERAL DEVICE COMMUNICATION IN VIRTUALIZED COMPUTER SYSTEM

(71) Applicant: RED HAT, INC., Raleigh, NC (US)

(72) Inventors: Michael Tsirkin, Yokne'am Illit (IL); Amnon Ilan, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 531 days.

(21) Appl. No.: 17/876,370

(22) Filed: Jul. 28, 2022

(65) Prior Publication Data

US 2024/0039700 A1 Feb. 1, 2024

(51) Int. Cl.
| | |
|---|---|
| *H04L 29/06* | (2006.01) |
| *G06F 9/455* | (2018.01) |
| *H04L 9/08* | (2006.01) |

(52) U.S. Cl.
CPC ........ *H04L 9/0819* (2013.01); *G06F 9/45558* (2013.01); *H04L 9/0861* (2013.01); *G06F 2009/45579* (2013.01); *G06F 2009/45587* (2013.01)

(58) Field of Classification Search
CPC . H04L 9/0819; H04L 9/0861; G06F 9/45558; G06F 2009/45579; G06F 2009/45587
See application file for complete search history.

(56) References Cited

U.S. PATENT DOCUMENTS

| | | |
|---|---|---|
| 5,610,715 A | 3/1997 | Yoshii et al. |
| 6,377,060 B1 | 4/2002 | Burkhart et al. |

| | | | | |
|---|---|---|---|---|
| 6,385,728 B1 * | 5/2002 | DeBry | ................. | G06F 21/608 |
| | | | | 709/229 |
| 7,142,674 B2 * | 11/2006 | Brickell | ............. | H04L 63/1466 |
| | | | | 380/285 |
| 8,023,528 B2 | 9/2011 | Hendel et al. | | |

(Continued)

FOREIGN PATENT DOCUMENTS

| | | | | |
|---|---|---|---|---|
| CN | 109858265 A | 6/2019 | | |
| CN | 112363800 A * | 2/2021 | ............. | G06F 21/44 |
| KR | 20100008678 A1 * | 7/2010 | | |

OTHER PUBLICATIONS

David Kaplan et al., AMD Memory Encryption, https://developer.amd.com/wordpress/media/2013/12/AMD_Memory_Encryption_Whitepaper_v7-Public.pdf, Apr. 21, 2016, 12 pages, Advanced Micro Devices.

(Continued)

*Primary Examiner* — Shawnchoy Rahman
(74) *Attorney, Agent, or Firm* — Womble Bond Dickinson (US) LLP

(57) ABSTRACT

Systems and methods for securing assigned peripheral device in virtualized computer system. An example method may comprise receiving, by a virtualized execution environment, a state measurement associated with a peripheral device of the computing system. Generating a guest cryptographic key. Responsive to validating the state measurement, transmitting, to the peripheral device, the guest cryptographic key encrypted using the device cryptographic key. Transmitting, to the peripheral device, an access request that is cryptographically signed using a first value derived from the device cryptographic key or a second value derived from the guest cryptographic key and encrypted using a third value derived from the guest cryptographic key.

15 Claims, 8 Drawing Sheets

(56)                    References Cited

U.S. PATENT DOCUMENTS

|              |        |          |                |
|--------------|--------|----------|----------------|
| 8,954,897    | B2     | 2/2015   | Neystadt et al. |
| 9,477,486    | B2     | 10/2016  | Raj et al. |
| 9,672,052    | B1     | 6/2017   | Berreth et al. |
| 9,678,895    | B2     | 6/2017   | Scott-Nash |
| 9,906,493    | B1     | 2/2018   | Rodgers et al. |
| 10,048,982   | B2     | 8/2018   | Chen et al. |
| 10,089,124   | B2     | 10/2018  | Barlev et al. |
| 10,127,389   | B1 *   | 11/2018  | Roth ..................... G06F 21/602 |
| 10,303,899   | B2     | 5/2019   | Durham et al. |
| 10,511,591   | B2 *   | 12/2019  | Campagna ............ H04L 63/061 |
| 2002/0004905 | A1 *   | 1/2002   | Davis ................... G06F 21/575 |
|              |        |          | 713/193 |
| 2002/0080974 | A1 *   | 6/2002   | Grawrock .......... G06Q 20/3821 |
|              |        |          | 380/282 |
| 2003/0048905 | A1 *   | 3/2003   | Gehring ............... H04L 9/0894 |
|              |        |          | 380/270 |
| 2005/0149737 | A1 *   | 7/2005   | Driscoll .................. G06F 21/51 |
|              |        |          | 713/182 |
| 2006/0093138 | A1 *   | 5/2006   | Durand ................ H04L 9/0844 |
|              |        |          | 380/44 |
| 2008/0066074 | A1     | 3/2008   | Nutter et al. |
| 2012/0079288 | A1 *   | 3/2012   | Hars ....................... G06F 21/00 |
|              |        |          | 713/193 |
| 2015/0106624 | A1 *   | 4/2015   | Gero .................... H04L 9/0869 |
|              |        |          | 713/171 |
| 2015/0199519 | A1 *   | 7/2015   | Marr ..................... G06F 21/577 |
|              |        |          | 726/22 |
| 2015/0295713 | A1 *   | 10/2015  | Oxford ................. H04L 9/3242 |
|              |        |          | 713/171 |
| 2016/0036587 | A1 *   | 2/2016   | Hans ..................... H04L 9/0861 |
|              |        |          | 713/193 |
| 2016/0239339 | A1     | 8/2016   | Chen et al. |
| 2017/0034165 | A1 *   | 2/2017   | Bagal .................... G06F 13/102 |
| 2018/0088804 | A1 *   | 3/2018   | Mummidi ............. G06F 3/0659 |
| 2018/0107608 | A1     | 4/2018   | Kaplan et al. |
| 2018/0239715 | A1     | 8/2018   | Tsirkin et al. |
| 2018/0247082 | A1     | 8/2018   | Durham et al. |
| 2020/0151362 | A1     | 5/2020   | Harriman et al. |
| 2020/0310972 | A1     | 10/2020  | Shanbhogue et al. |
| 2021/0294628 | A1     | 9/2021   | Tsirkin |
| 2021/0389965 | A1     | 12/2021  | Dabak et al. |

OTHER PUBLICATIONS

Mengyuan Li et al., Exploiting Unprotected I/O Operations in AMD's Secure Encrypted Virtualization, https://www.usenix.org/system/files/sec19-li-mengyuan_0.pdf, Aug. 14-16, 2019, 17 pages, The Ohio State University; University of Central Florida.

ZeCoRx—Zero Copy Receive, 1. https://www.mikelangelo-project.eu/technology/zecorx-zero-copy-receive/, 4 pages, downloaded Nov. 27, 2019.

* cited by examiner

100

COMPUTING SYSTEM 110

VIRTUAL MACHINE 144

GUEST OS 148

DEVICE COMMUNICATION
COMPONENT 150

OPERATING SYSTEM 140

HYPERVISOR 142

MEMORY 116

VM MEMORY
SPACE 118

SHARED MEMORY
SPACE

CPU 112

ENCRYPTION
ENGINE

DEVICE
CONTROLLER 126

MEMORY 128

CONFIG. SPACE
130

PERIPHERAL DEVICE
122

STORAGE 170

NETWORK 160

VIRTUALIZATION
CONTROLLER 180

300

PERIPHERAL DEVICE 122

DEVICE CONROLLER 126

COMMUNICATION MODULE 310

VALIDATION MODULE 312

DECRYPTION MODULE 314

DATA STORE 330

PUBLIC CRYPTOGRAPHIC KEY 332

PRIVATE CRYPTOGRAPHIC KEY 334

GUEST CRYPTOGRAPHIC KEY 338

STATE MEASUREMENTS 340

400

VIRTUAL MACHINE 144

GUEST OS 148

COMMUNICATION MODULE 410

VALIDATION MODULE 412

EPHEMERAL GENERATION MODULE 414

KEY GENERATION MODULE 416

ENCRYPTION MODULE 418

DATA STORE 430

PUBLIC CRYPTOGRAPHIC KEY 432

EPHEMERAL VALUE 434

GUEST CRYPTOGRAPHIC KEY 436

PREDETERMINED TRANSFORMATION 438

STATE MEASUREMENT 440

500

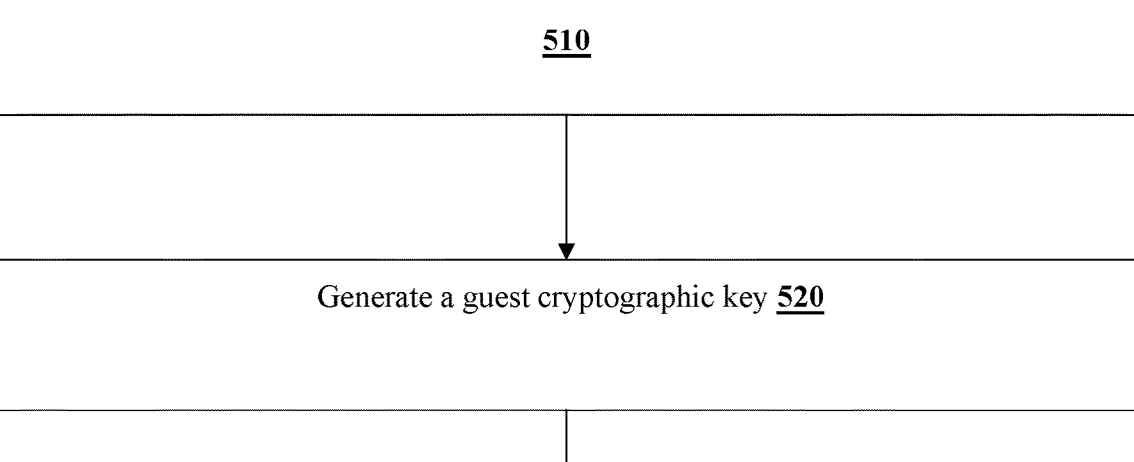

Receive, by a virtualized execution environment running on a computing system, a state measurement associated with a peripheral device of the computing system

510

Generate a guest cryptographic key 520

Responsive to validating the state measurement, transmit, to the peripheral device, the guest cryptographic key encrypted using the device cryptographic key 530

Transmit, to the peripheral device, an access request that is cryptographically signed using one of: a first value derived from the device cryptographic key or a second value derived from the guest cryptographic key and encrypted using a third value derived from the guest cryptographic key. 540

FIG. 5

600

Transmit, to a virtual machine running on a computing system, a state measurement associated with the peripheral device of the computing system

610

Receive, from the virtual machine, a guest cryptographic key encrypted using the device cryptographic key

620

Receive, from the virtual machine, an access request that is cryptographically signed using one of: a first value derived from the device cryptographic key or a second value derived from the guest cryptographic key and encrypted using a third value derived from the guest cryptographic key.

SECURED PERIPHERAL DEVICE COMMUNICATION IN VIRTUALIZED COMPUTER SYSTEM

TECHNICAL FIELD

Embodiments of the present disclosure relate to virtualization systems, and more specifically, relate to secured peripheral device communication in virtualized computer systems.

BACKGROUND

A virtual machine (VM) is a portion of software that, when executed on hardware of a host computer system, creates an environment allowing for an abstraction of some physical components of the host computer system in order to allow running of various modules, for example, multiple operating systems, concurrently and in isolation from other modules. Virtualization permits, for example, consolidating multiple physical servers into one physical server running multiple VMs in order to enhance the hardware utilization rate. The host allocates a certain amount of its resources to each VM. Each VM can then use the allocated resources to execute applications, including operating systems (guest operating systems (OS)). A software layer providing the virtualization may be referred to as a hypervisor, a virtual machine monitor (VMM), or a kernel-based hypervisor, to name a few examples. Hypervisor emulates the underlying hardware of the host computer system, making the use of VM transparent to the guest OS and the user of VM. A VM may have a virtual processor, virtual system memory, virtual storage, and various virtual devices.

BRIEF DESCRIPTION OF THE DRAWINGS

Disclosure is illustrated by way of example, and not by way of limitation, and may be more fully understood with references to the following detailed description when considered in connection with the figures, in which:

FIG. 5 is a flow diagram of a method for secured peripheral device communication in virtualized computer systems, in accordance with embodiments of the present disclosure.

FIG. 6 is a flow diagram of another method for secured peripheral device communication in virtualized computer systems, in accordance with embodiments of the present disclosure.

DETAILED DESCRIPTION

Figure 1:
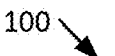
FIG. 1 illustrates a high-level component diagram of an example architecture for a virtualization system, in accordance with one or more aspects of the present disclosure.

Described herein are methods and systems for secured peripheral device communication in virtualized computer systems. In virtualized systems, a hypervisor may expose a virtual device to a VM running on a host computing system to permit VM to execute instructions on a virtual device. A virtual device may be represented by a device driver that provides an interface to a peripheral device connected to the host computing system. A peripheral device is a device that is internally or externally connected to a computing system, such as the host computing system, and performs an input operation and/or an output operation upon receiving a request from the computing system. For example, a hypervisor may create a virtual networking device that exposes a physical networking device to VM. VM may send a packet on the network attached to the physical networking device by executing an instruction to send the packet via the virtual networking device. VM may also receive data from the virtual peripheral device. In another example, the physical networking device may receive a packet via the network, and the networking device may send data included in the packet to VM via the virtual networking device.

Direct memory access (DMA) is a hardware feature that enables a hardware component (e.g., a network card, graphics card, etc.) to access the system memory without interacting with a central processing unit (CPU). In virtualized systems, a portion of physical memory of the host computing system may be reserved to facilitate DMA between VM and a peripheral device exposed to VM as a virtual device. For example, a DMA buffer may be reserved in the host memory. In particular, a portion of physical memory of the peripheral device is mapped to an address space of VM. VM may access the DMA buffer through the address space of the VM mapped to the portion of physical memory of the peripheral device. Accordingly, VM and the peripheral device may execute instructions to program data stored in the DMA buffer (e.g., read data stored in the DMA buffer, write data stored in the DMA buffer, etc.).

Encrypted virtualization provides a security paradigm that protects VMs from unauthorized access, e.g., by other VMs and/or a hypervisor that manages VMs. When encrypted virtualization is enabled, an encryption engine (e.g., firmware, circuitry of a processing device, etc.) of the host system may encrypt each memory page of a VM running on the host computer system with an encryption key that is unknown to other VMs and/or the hypervisor. Data received from or transmitted to a peripheral device exposed to an encrypted VM may be encrypted with the encryption key in order to prevent other VMs and/or the hypervisor from accessing the data.

Some implementations utilize an un-encrypted portion of host memory to facilitate the transmission of private VM data between a VM and a peripheral device. Data transmitted from the peripheral device to the VM may be initially stored in the un-encrypted portion of host memory. The data may be encrypted, with the encryption key, by an encryption engine of a processing device of the host computing system and copied to the portion of memory reserved to facilitate DMA between VM and the physical device (e.g., a DMA buffer). Similarly, encrypted data transmitted from VM to the peripheral device may be initially stored at the DMA buffer. Data may then be un-encrypted, with the encryption key, by the encryption engine and copied to the un-encrypted portion of the host memory before being accessed by the peripheral device.

The above-described implementations may result in a significant increase in overall system latency as data is copied between the un-encrypted portion of the host memory and the DMA buffer during each instance of data transmission between the encrypted VM and the peripheral device. In some instances, copying between the un-encrypted portion of the host memory and the DMA buffer can increase overall system latency by as much as 15%. Further, as a VM is unable to distinguish between a real peripheral device and an emulated virtual device, a malicious hypervisor may access private VM data by emulating a trusted peripheral device and accessing data transmitted from the VM to the trusted peripheral device through the un-encrypted portion of host memory.

Aspects of the present disclosure address the above-noted and other deficiencies by providing methods and systems for secured peripheral device communication in virtualized computer systems (e.g., communications between a virtual machine (VM) and the peripheral device). Responsive to a request by a VM running on a computing system to perform input/output operations on a peripheral device connected to the computing system, the peripheral device transmits a state measurement associated with the peripheral device and a device cryptographic key associated with the peripheral device to VM. In some embodiments, the state measurement associated with the peripheral device is a hash function of the contents of the memory and registers of the peripheral device. For example, the state measurement is a computed hash function of a snapshot of all the variables of the peripheral device. Depending on the embodiment, the state measurements may include a hash of the firmware of the peripheral device and/or a hash of the peripheral device state. Depending on the embodiment, the state measurement and/or the device cryptographic key may be cryptographically signed using the device cryptographic key or an electronic signature associated with a vendor and/or manufacturer of the peripheral device.

In an embodiment, responsive to receiving the state measurement and/or the device cryptographic key, VM may verify the device cryptographic key or the electronic signature accompanying the state measurement. The device cryptographic key is verified using the device cryptographic key associated with the peripheral device. Electronic signature is verified using a predetermined electronic signature indicated by a vendor and/or manufacturer of the peripheral device. Verification processes confirm that the state measurement and/or the device cryptographic key is associated with a specific peripheral device. Accordingly, VM may validate the state measurement associated with the peripheral device. Validating the state measurement may include comparing the state measurement received by the peripheral device with an expected state measurement of the peripheral device (e.g., firmware is up-to-date or an expected version and/or the device state is an expected device state according to vendor/manufacturing specification).

Upon validation of the state measurement of the peripheral device, VM generates an ephemeral value (e.g., by a random number generation). Based on the generated ephemeral value, VM generates a guest cryptographic key. In some embodiments, VM may generate the guest cryptographic key from the ephemeral value and device cryptographic key by applying a predetermined transformation (such as a cryptographic hash function) to the ephemeral value and device cryptographic key. In some implementations, VM may generate the guest cryptographic key from the device cryptographic key solely by applying a predetermined transformation (such as a cryptographic hash function) to the device cryptographic key, thus eliminating the need to generate an ephemeral value in order to produce the guest cryptographic key. VM may transmit the guest cryptographic key encrypted using the device cryptographic key to the peripheral device. In some embodiments, the guest cryptographic key may be encrypted using the guest cryptographic key or a value derived from the guest cryptographic key. In some instances, when using a value derived from a key, the derivation may include a transformation. Once the guest cryptographic key is received by the peripheral device, the peripheral device stores the guest cryptographic key for use in future access requests by VM by decrypting the encrypted guest cryptographic key. Accordingly, with each access request directed to the peripheral device, VM may cryptographically sign the access request with the device cryptographic key, a value derived from the device cryptographic key, the guest cryptographic key, or a value derived from the guest cryptographic key and encrypt the access request with the guest cryptographic key or a value derived from the guest cryptographic key. Once the access request is cryptographically signed and encrypted, VM transmits the access request to the peripheral device, in which the peripheral device decrypts (using the guest cryptographic key) and validates the access request (using the device cryptographic key, the value derived from the device cryptographic key, the guest cryptographic key, or the value derived from the guest cryptographic key) prior to proceeding with the access request with respect to the peripheral device.

Accordingly, aspects of the present disclosure dramatically improve overall system latency by eliminating copying operations performed during each transmission of data between VM and a peripheral device. Further, aspects of the present disclosure prevent a malicious hypervisor and/or other VMs from accessing private VM data. Peripheral device provides a device cryptographic key specific to the peripheral device to VM, which is verified by VM prior to the generation of a guest cryptographic key based on an ephemeral key (e.g., generated by VM). Each subsequent data transmission between the peripheral device and VM is cryptographically signed using the device cryptographic key, the value derived from the device cryptographic key, the guest cryptographic key, or the value derived from the guest cryptographic key and encrypted using the guest cryptographic key.

In the event, that VM is unable to verify the received device cryptographic key (e.g., a device cryptographic key received from a malicious hypervisor and/or other VMs) the VM will not transmit a guest cryptographic key generated based on an ephemeral key for secured communication between VM and the malicious hypervisor and/or other VMs posing as a peripheral device. In the event the VM can verify a device cryptographic key received from the peripheral device, VM can transmit a guest cryptographic key generated based on an ephemeral key for secured communication between VM and the peripheral device that is protected from interference by a malicious hypervisor and/or other VMs. A peripheral device cannot validate communication received from a malicious hypervisor and/or other VMs since the malicious hypervisor and/or other VMs is unaware of the guest cryptographic key, and therefore, VM is informed that a malicious hypervisor and/or other VMs has tampered with the peripheral device.

FIG. 1 illustrates a virtualization system 100 in which embodiments of the present disclosure may operate. It should be noted that other architectures for virtualization system 100 are possible, and that the implementation of a virtualization system 100 utilizing embodiments of the disclosure are not necessarily limited to the specific architecture depicted by FIG. 1.

Virtualization system 100 may include a computing system 110, one or more storage devices 170 and a virtualization controller 180, which may all be communicably connected over a network 160. Virtualization system 100 may be a processing device (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to implement secure communication during virtualization, in accordance with the present disclosure.

Network 160 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, computing system 110 may belong to a cluster comprising additional computer systems not depicted in FIG. 1, while in some other implementations, computing system 110 may be an independent system that is capable of communicating via network 160.

Computing system 110 may include hardware components, such as a physical central processing unit (CPU) 112. One or more processors may be embodied as CPU 112, which may be and/or include a micro-processor, digital signal processor (DSP), or other processing component. CPU 112 may process various received data and may carry out the code or instructions or one or more computer programs, for example, to provide input/output operations specified by the instructions. Computing system 100 may further include memory 116 and one or more peripheral devices 122.

Memory 116 may include volatile memory devices (e.g., random access memory (RAM)), non-volatile memory devices (e.g., flash memory), storage devices (e.g., a magnetic hard disk, a Universal Serial Bus (USB) solid state drive, a Redundant Array of Independent Disks (RAID) system, a network attached storage (NAS) array, etc.), and/or other types of memory devices. It should be noted that even though a single CPU 112 is depicted in FIG. 1 for computing system 110, this is merely illustrative, and that in some other examples, computing system 110 may include a two or more CPUs. Similarly, in some other examples, computing system 110 may include two or more memory components, rather than a single memory component.

Computing system 110 may host one or more virtual execution environments, such as containers or virtual machines (VMs), such as VM 144. Computing system 110 may execute an operating system 140 (e.g., a host OS) to manage its resources. Each VM may execute a guest OS 148. Computing system 110 may execute hypervisor 142 to virtualize access to underlying host hardware, making the use of VMs running on computing system 110 transparent to the guest OS 148 running on VMs and users (e.g., a system administrator) of computing system 110.

Peripheral device 122 may be any device that is internally or externally connected to another device, such as computing system 110, and performs an input operation and/or an output operation upon receiving a request from the connected device. Examples of a peripheral device include, but are not limited to, for an input operation, a mouse, keyboard, graphics tablet, image scanner, barcode reader, game controller, light pen, light gun, microphone, digital camera, webcam, dance pad, and read-only memory; for an output operation, a printer, computer monitor, projector, headphones, computer speaker; and for an input and output operation, a disk drive, USB flash drive, memory card and tape drive. In some embodiments, peripheral device 122 may be a storage device or a networking device. For example, peripheral device 122 may be a secure storage device (e.g., an encrypted storage device) or a secure networking device (e.g., an Internet Protocol Security (IPsec) enabled networking device). Secure storage device and/or the secure networking device may normally encrypt data received at the device. For example, a secure storage device may encrypt data received by the secure storage device to be stored at the secure storage device. In another example, an IPsec enabled networking device may encrypt data packets received at the networking device using the IPsec protocol prior to transmitting the data packets to another component.

Peripheral device 122 may include a device controller 126 and a local device memory 128 ("memory 128" in short). Device controller 126 executes DMA operations stored in the local device memory 128, in accordance with embodiments described below. Local device memory 128 may include volatile memory devices, non-volatile memory devices, storage devices, and/or other types of memory devices. Local device memory 128 may include a configuration space 130. Configuration space 130 may be a portion of local device memory 128 allocated to facilitate configuration of peripheral device 122 by computing system 110. For example, configuration space 130 may store a device cryptographic key associated with peripheral device 122. The device cryptographic key may be externally provisioned and programmed during or post-manufacturing, or can be generated by the peripheral device 122 by combining the content (e.g., peripheral device identification, manufacturer identification, and/or other identification information associated with the peripheral device) of the portion of local device memory 128 allocated to facilitate configuration of peripheral device 122 with input(s) from some entropy source(s), such as timer, network, etc.

Device cryptographic key may be used by device controller 126 to facilitate secure communication with computing system 110. In some embodiments, configuration space 130 may include a shared portion and a private portion. Shared portion may be a portion of configuration space 130 that is accessible to VM 144. Private portion may be a portion of configuration space 130 that is encrypted using an encryption key. In some embodiments, the private portion may be accessible by VM 144 using the encryption key provided by peripheral device 122.

VM 144 may include a device communication component 150 that provides an encrypted virtualization mechanism to encrypt communication from VM 144 to peripheral device 122 to protect peripheral device 122 from physical threats, as well as from other VMs and hypervisor 142. In one embodiment, device communication component 150 may be implemented as hardware circuitry of a CPU 112. In some implementations, device communication component 150 may be provided as firmware installed on computing system 110. In some embodiments, device communication component 150 can be configured to encrypt communication from VM 144 to peripheral device 122 using a guest cryptographic key generated from an ephemeral value.

Figure 2A:
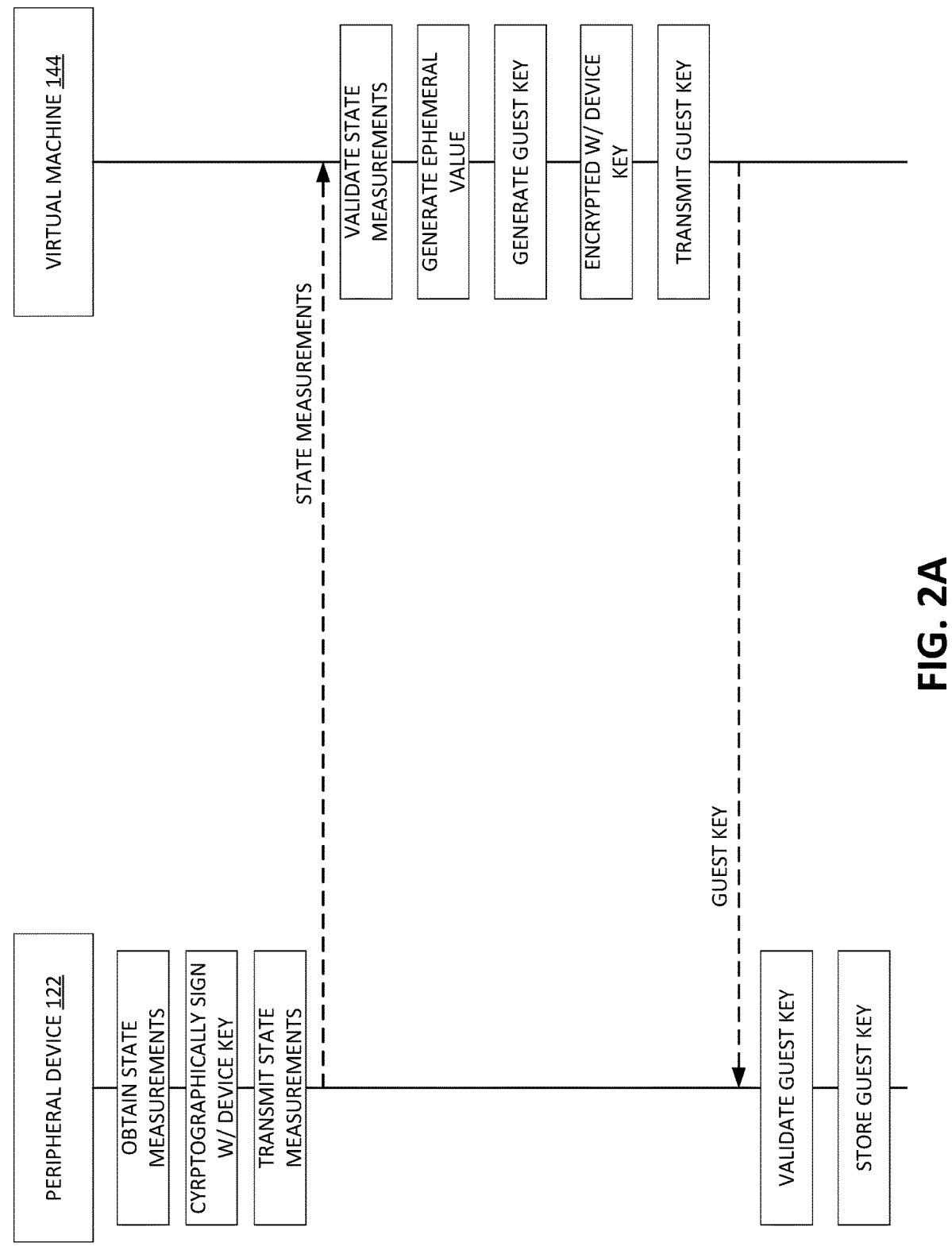
FIG. 2A-B illustrative interaction diagram of a secured peripheral device communication in virtualized computer systems, in accordance with embodiments of the present disclosure.
Figure 2B:
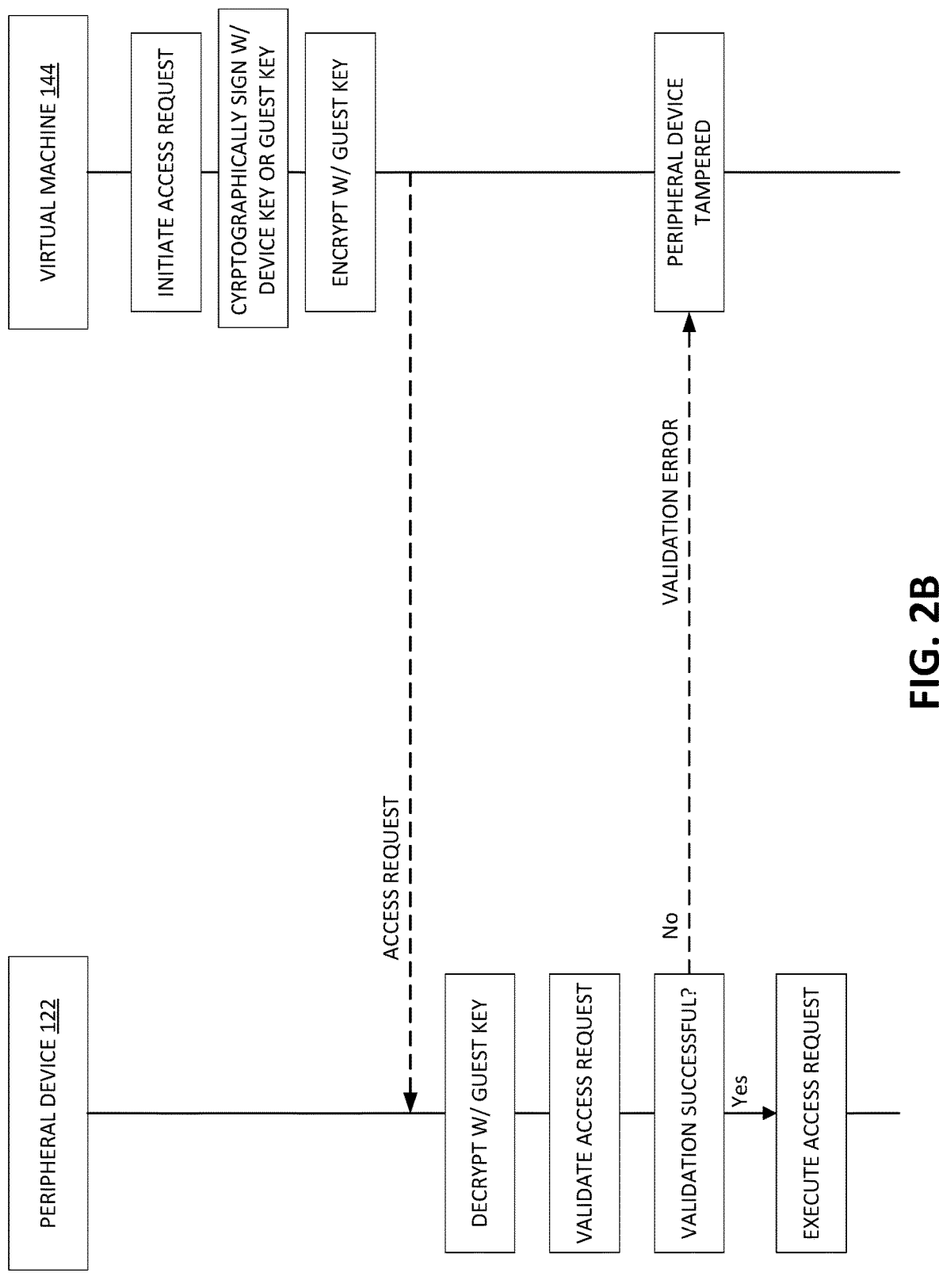

FIG. 2A-B illustrates an interaction diagram 200 between a peripheral device and a VM operating on a computing system, in accordance with embodiments of the present disclosure. Peripheral device may be peripheral device 122 and VM may be VM 144, described with respect to FIG. 1.

Referring to FIG. 2A, peripheral device 122 may obtain a state measurement of itself. As previously described, the state measurements may be a snapshot of the memory and registers of the peripheral device (e.g., firmware of the peripheral device and/or memory state associated with the peripheral device). Peripheral device 122 may cryptographically sign the state measurements with a device key (e.g., device cryptographic key) associated with peripheral device 122. Cryptographic signature is a method of computing a hash of a message that is being cryptographically signed and encrypting the hash with a cryptographic key (e.g., a private key). Receiver of the message may decrypt the hash with the cryptographic key (e.g., a public key) and compare the hash computed by the sender with a hash computed by the receiver, thus verifying that the message has not been tampered with. Once the state measurements have been cryptographically signed, peripheral device 122 may transmit the state measurements to VM 144.

In some embodiments, peripheral device 122 may expose the device key by storing the device key in configuration space 130 of local device memory 128. For example, peripheral device 122 may store the public device key in the shared portion of configuration space 130. In some embodiments, VM 144 may retrieve the state measurements and/or the device key from configuration space 130 of local device memory 128. For example, VM 144 may retrieve the state measurements and/or the device key from the shared portion of configuration space 130. In other or similar embodiments, VM 144 may receive the state measurements and/or the device key from peripheral device 122 or hypervisor 142. For example, peripheral device 122 may transmit the state measurements and/or the device key to VM 144 (e.g., via the configuration space 130).

Responsive to receiving the state measurement, VM 144 may validate the state measurement (e.g., using the device key to decrypt a computed hash associated with the state measurement and compare the computed hash with a hash of the state measurement re-computed by VM 144).

In some embodiments, VM 144 may verify the electronic signature associated with the state measurements and/or the device key. For example, VM 144 may have access to a data structure including identifiers of one or more devices that are trusted by guest OS 148. A device may be determined to be trusted by guest OS 148 in response to a determination that the device satisfies one or more security and/or privacy conditions pertaining to the operation of VM 144 on computing system 110. VM 144 may compare the electronic signature associated with the guest cryptographic key with each identifier included in the data structure. In response to determining that the electronic signature corresponds with an identifier included in the data structure, VM 144 may determine that peripheral device 122 is a trusted device.

Once the state measurements are validated and/or peripheral device 122 is determined to be a trusted device, the virtual machine may further confirm that the state measurements (e.g., firmware of the peripheral device and/or peripheral device state associated with the peripheral device) are as expected for peripheral device 122. For example, that the firmware of peripheral device 122 is an expected version and/or that the state of peripheral device 122 is an expected state according to vendor and/or manufacturer). Any suitable means to validate the state measurements associated with a peripheral device and/or the peripheral device itself is contemplated. The expected version and/or value to validate the state measurements associated with the peripheral device and/or peripheral device itself is received by the VM from the peripheral device manufacturer and/or vendor and stored in a secure memory of the VM.

In some embodiments, responsive to validating the state measurements, VM 144 may generate an ephemeral value.

An ephemeral nonce value may be an arbitrary number that is used once in a single cryptographic communication between VM 144 and peripheral device 122. In other or similar embodiments, CPU 112 can generate the ephemeral value, and VM 144 can retrieve the ephemeral value from CPU 112. VM 144 may generate a guest key (e.g., a guest cryptographic key) associated with peripheral device 122 using the ephemeral value and the device key.

The guest key may be generated, e.g., by applying a predetermined transformation to the ephemeral value and the device key to generate the guest key. Predetermined transformation, which maps its arguments (e.g., the ephemeral value and the device key) to an output value (e.g., the guest key), may be represented, for example, by a mathematical function, such as a cryptographic hash function. VM 144 may also generate the guest key directly from the ephemeral value and the device key without the predetermined transformation. In another embodiment, VM 144 may also generate the guest key from the device key with or without the predetermined transformation. In yet another embodiment, VM 144 may also generate the guest key from the ephemeral value with or without the predetermined transformation. Guest key may be a symmetric key used to encrypt a request sent to peripheral device 122 and decrypt the access request received from VM 144.

VM 144 may transmit the guest key to peripheral device 122. In some embodiments, VM 144 may encrypt the guest key with the device key. In other or similar embodiments, VM 144 may transmit the guest key encrypted with the device key to hypervisor 142. Responsive to receiving the guest key encrypted with the device key, hypervisor 142 may transmit the guest key encrypted with the device key to peripheral device 122. In other or similar embodiments, VM 144 may store the guest key encrypted with the device key in the shared portion of configuration space 130, and device controller 126 may retrieve the guest key encrypted with the device key from the shared portion of configuration space 130.

Responsive to receiving the guest key, peripheral device 122 may decrypt the guest key (e.g., using a device key). Once decrypted, the peripheral device may store the guest key in the configuration space 130 of peripheral device 122. Responsive to storing the guest key to peripheral device 122, VM 144 may use the guest key to encrypt access requests directed to peripheral device 122 and, in some instances, cryptographically sign the access request with the device key, a value derived from the device key with or without the predetermined transformation, the guest key, or a value derived from the guest key with or without the predetermined transformation.

Referring to FIG. 2B, VM 144 may initiate an access request directed to peripheral device 122. VM 144 may identify a device key and/or a guest key associated with peripheral device 122. In some embodiments, VM 144 may cryptographically sign the access request with the device key associated with peripheral device 122 (or a value derived from the device key with or without the predetermined transformation). In some embodiments, VM 144 may cryptographically sign the access request with the guest key associated with peripheral device 122 (or a value derived from the guest key with or without the predetermined transformation). Once the access request is cryptographically signed, VM 144 may encrypt to the access request with the guest key (or a value derived from the guest key with or without the predetermined transformation). VM 144 transmits the access request (cryptographically signed and encrypted) to peripheral device 122.

Peripheral device 122 decrypts the access request (which is cryptographically signed and encrypted) using the guest key associated with VM 144. Once the access request is decrypted, peripheral device 122 validates the access request (e.g., using a device key or guest key to decrypt a computed hash associated with the access request and compare the computed hash with a hash of the access request re-computed by peripheral device 122). If validation is successful (e.g., decryption is successful and the computed hash matches the hash re-computed by peripheral device 122), peripheral device 122 executes and/or performs the access request on peripheral device 122. If validation is unsuccessful (e.g., decryption is fails and the computed hash does not match the hash re-computed by peripheral device 122), peripheral device 122 transmits to VM 144 a validation error. VM 144 may receive the validation error and interpret the validation as an indication that the access request is unable to proceed due to a malicious hypervisor and/or other VMs are attempting to tamper with peripheral device 122 (e.g., unmapping of peripheral device 122, altering one or more keys associated with peripheral device 122, etc.).

Figure 3:
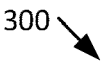
FIG. 3 depicts a block diagram illustrating an example of a peripheral device connected to a computing system, in accordance with embodiments of the present disclosure.

FIG. 3 depicts a block diagram illustrating an example 300 of a peripheral device connected to a computing system, in accordance with embodiments of the present disclosure. In some embodiments, the peripheral device may be peripheral device 122, described with respect to FIG. 1. Peripheral device 122 may include device controller 126 and a data store 330.

As illustrated, device controller 126 can include a communication module 310, a validation module 312, and a decryption module 314. Communication module 310 can communicate with data store 330 storing a device cryptographic key, also previously referred to as a device key (e.g., a public cryptographic key 332 or a private cryptographic key 334), and a guest cryptographic key 338 (e.g., guest key). In some embodiments, data store 330 can include one or more portions of memory 116. In other or similar embodiments, data store 330 can include one or more portions of configuration space 130.

Device controller 126 can generate a snapshot all the variables (e.g., firmware of the peripheral device and/or peripheral device state) of the peripheral device 122 (e.g., state measurements 340) and store the state measurement 340 in data store 330. As previously described, state measurement 340 may include a hash of the firmware of the peripheral device 122 and/or a hash of the peripheral device state.

Communication module 310 can further communicate with various components of computing system 110, such as hypervisor 142 and guest OS 148. For example, communication module 310 can expose public cryptographic key 332 to VM 144 by transmitting public cryptographic key 332 to VM 144, in accordance with previous embodiments. In another example, communication module 310 can provide public cryptographic key 332 to VM 144 by storing public cryptographic key 332 in a predetermined portion of memory, such as the portion of configuration space 130 that is accessible to VM 144 (i.e., the private portion of configuration space 130).

Communication module 310 may also receive communications (e.g., access requests, messages, or any other suitable communications) transmitted to peripheral device 122. For example, communication module 310 may receive guest cryptographic key 338 encrypted with the device cryptographic key from VM 144, in accordance with previously described embodiments. Responsive to receiving the encrypted guest cryptographic key 338, the decryption module 314 may decrypt the guest cryptographic key 338 encrypted with the device key. In response to decrypting the guest key encrypted with the device key from VM 144, the communication module 310 may store guest cryptographic key 338 in the data store 330. Accordingly, the peripheral device 122 may begin receiving cryptographically signed and/or encrypted access requests from virtual machines 144.

In response to the communication module 310 receiving a cryptographically signed and/or encrypted access request from VM 144, decryption module 314 may decrypt the access request using guest cryptographic key 338 in the data store 330. Responsive to decrypting the access request, validation module 312 may validate the decrypted access request by using a device cryptographic key or guest cryptographic key to decrypt a computed hash associated with the access request and compare the computed hash with a hash of the access request re-computed by peripheral device 122. Accordingly, validation module 312 verifies that the access request has not been tampered with. Responsive to validating the access request, the access request with respect to the peripheral device 122 may proceed.

Responsive to failing validation of the access request, the communication module 310 may transmit to VM 144, a validation error which is typically interpreted by VM 144 as an indication that the access request is unable to proceed due to a malicious hypervisor and/or other VMs are attempting to tamper with peripheral device 122 (e.g., unmapping of peripheral device 122, altering one or more keys associated with peripheral device 122, etc.).

Figure 4:
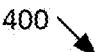
FIG. 4 depicts a block diagram illustrating an example of the guest operating system (OS) of a VM running on a computing system, in accordance with embodiments of the present disclosure.

FIG. 4 depicts a block diagram illustrating an example 400 of the guest operating system (OS) of a VM running on a computing system, in accordance with embodiments of the present disclosure. In some embodiments, the guest OS may be guest OS 148 of VM 144, described with respect to FIG. 1. guest OS 148 may include VM 144 and data store 430.

As illustrated, VM 144 can include a communication module 410, a validation module 416, an ephemeral generation module 414, a key generation module 416, and an encryption module 418. Communication module 410 can communicate with data store 430, storing a public cryptographic key 432, an ephemeral value 434, a guest cryptographic key 436, a predetermined transformation 438, and state measurements 440, including one or more trusted devices. In some embodiments, data store 430 can include one or more portions of memory 116. In other or similar embodiments, data store 430 can include one or more portions of VM memory space 118.

Communication module 410 can further communicate with various components of computing system 110, such as hypervisor 142 and peripheral device 122. For example, communication module 410 can receive state measurements 440 cryptographically signed using device cryptographic key (e.g., public cryptographic key 332 from peripheral device 122), in accordance with previously described embodiments. Responsive to receiving the state measurements 440, communication module 410 may provide state measurements 440 to validation module 412 to validate state measurements 440 by using a device cryptographic key to decrypt a computed hash associated with state measurements 440 and compare the computed hash with a hash of state measurements 440 re-computed by VM 144). Accordingly, validation module 412 verifies that state measurements 440 have not been tampered with. Once the state measurements are validated, the validation module 412 may further confirm that the state measurements 440 (e.g., the firmware of the peripheral device and/or peripheral device state associated with the peripheral device) are as expected for peripheral device 122. For example, that the firmware of peripheral device 122 is an expected version and/or that the state of peripheral device 122 is an expected state according to vendor and/or manufacturer). Depending on the embodiment, validation module 412 may store state measurements 440 in data store 430.

Upon validation of the state measurements 440, ephemeral generation module 414 may generate ephemeral value 434 to be used to produce a guest cryptographic key 436, in accordance with previously described embodiments. In some embodiments, ephemeral generation module 414 may generate ephemeral value 434 prior to communication module 410 receiving the state measurements 440. In other or similar embodiments, ephemeral generation module 414 may generate ephemeral value 434 in response to validation module 412 validating the state measurements 440. Responsive to generating the ephemeral value 434, ephemeral generation module 414 may store the ephemeral value 434 in the data store 430.

Key generation module 416 may generate guest cryptographic key 436 using public cryptographic key 432, the ephemeral value 434, and the predetermined transformation 438. Key generation module 416 may apply the predetermined transformation 438 to public cryptographic key 432 and the ephemeral value 434 to generate guest cryptographic key 436. Key generation module 412 may generate guest cryptographic key 436, in accordance with previously described embodiments. Responsive to generating guest cryptographic key 436, key generation module 416 may store guest cryptographic key 436 in the data store 430.

Responsive to key generation module 416 generating and/or storing generating guest cryptographic key 436, communication module 410 may transmit guest cryptographic key 436 to peripheral device 122. In some embodiments, upon validation of the state measurements 440, communication module 410 may transmit guest cryptographic key 436 to peripheral device 122.

Responsive to receiving an access request from an application running on VM 144 directed to peripheral device 122, communication module 310 identifies public cryptographic key 432 and/or guest cryptographic key 436 associated with peripheral device 122. Access request is provided to encryption module 418 prior to transmitting the access request to peripheral device 122.

Encryption module 418 may cryptographically sign the access request with public cryptographic key 432 and/or guest cryptographic key 436, in accordance with previously described embodiments. Once the access request is cryptographically signed, encryption module 418 encrypts the access request with guest cryptographic key 436. Once the access request is cryptographically signed and encrypted, communication module 410 transmits the access request to peripheral device 122.

Responsive to peripheral device 122 receiving, decrypting, and validating, the access request, in accordance with previously described embodiments, the communication module 410 may receive an indication that the access request is allowed to proceed with respect to the peripheral device 122. Responsive to peripheral device 122 receiving, decrypting, and failing validation of the access request, in accordance with previously described embodiments, communication module 410 may receive a validation error. Communication module 410 may include an error handling or may be a separate module. Accordingly, communication module 410 may determines that the validation error is an indication that the access request is unable to proceed due to a malicious hypervisor and/or other VMs are attempting to tamper with peripheral device 122 (e.g., unmapping of peripheral device 122, altering one or more keys associated with peripheral device 122, etc.).

FIG. 5 depicts a flow diagram of an illustrative example of a method 500 for providing storage snapshots in a nested virtualization environment, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. Term "article of manufacture," as used herein, is intended to encompass a computer program accessible from any computer-readable device or storage media. In one implementation, method 500 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 500 may be performed by processing devices of a server device or a client device and may begin at block 510. At block 510, the processing device receives, by a virtual machine running on a computing system, a state measurement associated with a peripheral device of the computing system. As previously described, the state measurements may be a snapshot of all the variables of the peripheral device (e.g., firmware of the peripheral device and/or peripheral device state associated with the peripheral device).

At block 520, the processing device generates a guest cryptographic key. To generate the guest cryptographic key, the processing device generates an ephemeral value to be used with the device cryptographic key to generate the guest cryptographic key. Ephemeral value may be a short-term value that is generated in response to validating the state measurement. The guest cryptographic key may be generated using any method for generating a cryptographic key, in accordance with the previously described embodiments.

At block 530, responsive to validating the state measurement, the processing device transmits, to the peripheral device, the guest cryptographic key encrypted using the device cryptographic key. To validate the state measurement, the processing device verifies that the state measurement has not been compromised using the device cryptographic key. As previously described, to verify that the state measurement has not been compromised, the hash associated with the state measurement is decrypted with the device cryptographic key and the hash is compared with a computed hash of the state measurement performed by the virtual machine, thus verifying that the message and/or request has not been tampered with.

Once the device cryptographic key is validated, the processing device compares the state measurement with an expected state measurement. As previously described, comparing the state measurement received by the peripheral device with an expected state measurement of the peripheral device (e.g., firmware is up-to-date or an expected version and/or the device state is an expected device state according to vendor/manufacturing specification).

At block 540, the processing device transmits, to the peripheral device, an access request that is cryptographically signed using the device cryptographic key (or a first value derived from the device cryptographic key with or without the predetermined transformation) or the guest cryptographic key (or a second value derived from the guest cryptographic key with or without the predetermined transformation) and encrypted using the guest cryptographic key (or a third value derived from the guest cryptographic key with or without the predetermined transformation). In some embodiments, responsive to receiving the access request, the processing devices decrypts the access request using the guest cryptographic key and validates the access request using the device cryptographic key or guest cryptographic key. As previously described, the peripheral device may validate the access request by using the device cryptographic key or guest cryptographic key to decrypt a computed hash associated with the access request and compare the computed hash with a computed hash of the access request performed by peripheral device.

Responsive to validating the access request, the processing device proceeds with the access request with respect to the peripheral device. Responsive to failing to validate the access request, the processing device transmits, to the virtual machine, a validation failure (e.g., validation error), wherein the validation failure indicates that the peripheral device has been compromised. In particular, the access request is unable to proceed due to a malicious hypervisor and/or other VMs attempting to tamper with peripheral device 122 (e.g., unmapping of peripheral device 122, altering one or more keys associated with peripheral device 122, etc.).

FIG. 6 depicts a flow diagram of an illustrative example of a method 600 for providing storage snapshots in a nested virtualization environment in accordance with one or more aspects of the present disclosure. Method 600 and each of its individual functions, routines, subroutines, or operations may be performed by one or more processors of the computer device executing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processes implementing method 600 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. Term "article of manufacture," as used herein, is intended to encompass a computer program accessible from any computer-readable device or storage media. In one implementation, method 600 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 600 may be performed by processing devices of a server device or a client device and may begin at block 610. At block 610, the processing device transmits, to a virtual machine running on a computing system, a state measurement associated with the peripheral device of the computing system. As previously described, the state measurements may be a snapshot of all the variables of the peripheral device (e.g., firmware of the peripheral device and/or peripheral device state associated with the peripheral device).

At block 620, the processing device receives, from the virtual machine, a guest cryptographic key encrypted using the device cryptographic key. At block 630, the processing device receives, from the virtual machine, an access request that is cryptographically signed using the device cryptographic key (or a first value derived from the device cryptographic key with or without the predetermined transformation) or the guest cryptographic key (or a second value derived from the guest cryptographic key with or without the predetermined transformation) and encrypted using the guest cryptographic key (or a third value derived from the guest cryptographic key with or without the predetermined transformation). Responsive to receiving the access request, the processing device decrypts the access request using the guest cryptographic key and validates the access request using the device cryptographic key. As previously described, the peripheral device may validate the access request by using the device cryptographic key to decrypt a computed hash associated with the access request and compare the computed hash with a computed hash of the access request performed by peripheral device.

Responsive to validating the access request, the processing device the processing device proceeds with the access request with respect to the peripheral device. Responsive to failing validation of the access request, the processing device transmits, to the virtual machine, a validation failure. The validation failure indicates that the peripheral device has been compromised. In particular, the access request is unable to proceed due to a malicious hypervisor and/or other VMs attempting to tamper with peripheral device 122 (e.g., unmapping of peripheral device 122, altering one or more keys associated with peripheral device 122, etc.).

Figure 7:
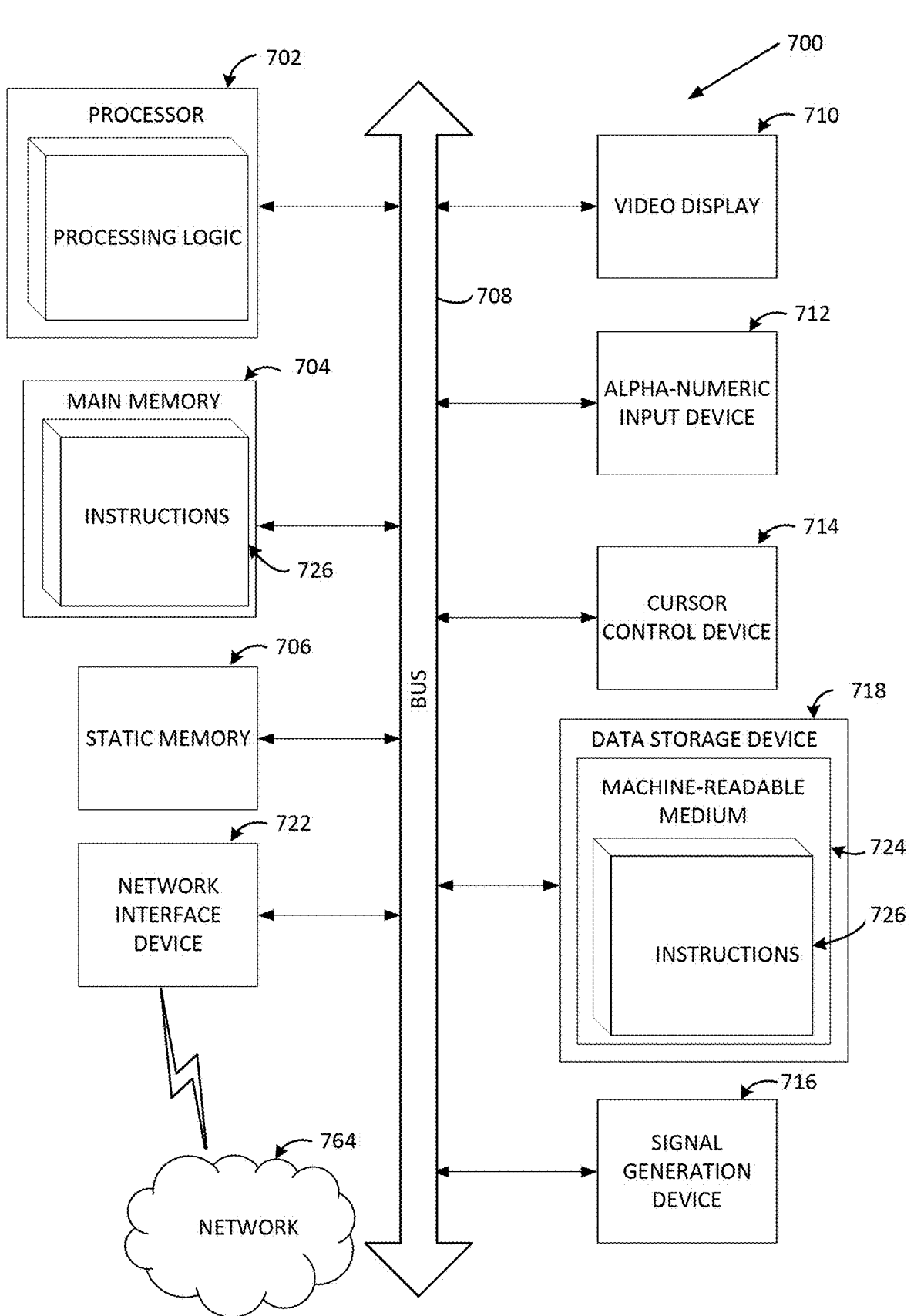
FIG. 7 is a block diagram illustrating a computing system in which implementations of the disclosure may be used.

FIG. 7 is a block diagram illustrating a computer system in which implementations of the disclosure may be used. In some implementations, the computer system 700 may support multicast live migration of encrypted VMs and/or transfer of encrypted VM snapshots, in accordance with previously described embodiments.

Computer system 700 may be included within a data center that supports virtualization. Virtualization within a data center results in a physical system being virtualized using VMs to consolidate the data center infrastructure and increase operational efficiencies. A VM may be a program-based emulation of computer hardware of the virtualized data center. For example, VM may operate based on computer architecture and functions of computer hardware resources associated with hard disks or other such memory. VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

Computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 708.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is to execute the instructions 726 for performing the operations and steps discussed herein.

Computer system 700 may further include a network interface device 722 communicably coupled to a network 764. Computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

Instructions 726 may reside, completely or partially, within volatile memory 704 and/or within processing device 702 during execution thereof by computer system 700, hence, volatile memory 704 and processing device 702 may also constitute machine-readable storage medium 724.

Instructions 726 may also implement VM 144 and peripheral device 122 to support secure communication between VM 144 and peripheral device 122.

Data storage device 718 may include a machine-readable storage medium 724 (e.g., a non-transitory computer-readable storage medium) on which may store instructions 726 encoding any one or more of the methods or functions described herein, including instructions for implementing method 500 of FIG. 5 and method 600 of FIG. 6.

Non-transitory computer-readable storage medium 724 may also be used to store instructions 726 to support caching results of certain commands utilized for building multi-platform application container images described herein, and/or a software library containing methods that call the above applications. While the computer-readable storage medium 724 is shown in an example implementation to be a single medium, the term "machine-accessible storage medium" should be taken to include a single medium or multiple media (e.g., a centralized or distributed database, and/or associated caches and servers) that store the one or more sets of instructions. Term "machine-accessible storage medium" shall also be taken to include any medium that is capable of storing, encoding or carrying a set of instruction for execution by the machine and that cause the machine to perform any one or more of the methodologies of the disclosure. Term "machine-accessible storage medium" shall accordingly be taken to include, but not be limited to, solid-state memories, and optical and magnetic media.

Unless specifically stated otherwise, terms such as "receiving," "invoking," "associating," "providing," "storing," "performing," "utilizing," "deleting," "initiating," "marking," "generating," "transmitting," "completing," "executing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

Methods and illustrative examples described herein are not inherently related to any particular computer or other apparatus. Various general purpose systems may be used in accordance with the teachings described herein, or it may prove convenient to construct more specialized apparatus to perform methods 500 and 600 and/or each of its individual functions, routines, subroutines, or operations. Examples of the structure for a variety of these systems are set forth in the description above.

Above description is intended to be illustrative, and not restrictive. Although the disclosure has been described with references to specific illustrative examples and implementations, it should be recognized that the disclosure is not limited to the examples and implementations described. Scope of the disclosure should be determined with reference to the following claims, along with the full scope of equivalents to which the claims are entitled.

What is claimed is:

1. A method comprising:
receiving, by a virtualized execution environment running on a computing system, a state measurement comprising a hash function associated with a peripheral device of the computing system;
retrieving, by the virtualized execution environment, a device cryptographic key generated by the peripheral device and stored on the peripheral device;
generating a guest cryptographic key based on applying a hash transformation to an ephemeral value;
responsive to validating the state measurement, transmitting, to the peripheral device, the guest cryptographic key encrypted using the device cryptographic key; and
transmitting, to the peripheral device, an access request that is cryptographically signed using at least one of: a first value derived from the device cryptographic key or a second value derived from the guest cryptographic key and encrypted using a third value derived from the guest cryptographic key.

2. The method of claim 1, wherein validating the state measurement comprises:
comparing the state measurement with an expected state measurement.

3. The method of claim 1, wherein the ephemeral value is a random value.

4. The method of claim 1, wherein the virtualized execution environment is represented by one of: a virtual machine or a container.

5. A peripheral device of a computing system, the peripheral device comprising:
a memory; and
a processing device operatively coupled to the memory, the processing device to:
generate a device cryptographic key associated with the peripheral device;
transmit, to a virtualized execution environment running on the computing system, a state measurement comprising a hash function associated with the peripheral device;
provide the device cryptographic key to the virtualized execution environment;
receive, from the virtualized execution environment, a guest cryptographic key generated based on applying a hash transformation to an ephemeral value and encrypted using the device cryptographic key; and
receive, from the virtualized execution environment, an access request that is cryptographically signed using at least one of: a first value derived from the device cryptographic key or a second value derived from the guest cryptographic key and encrypted using a third value derived from the guest cryptographic key.

6. The peripheral device of claim 5, wherein, to receive the guest cryptographic key cryptographically signed using the device cryptographic key, the processing device is to:
verify that the guest cryptographic key has not been compromised using the device cryptographic key; and store the guest cryptographic key in a configuration space of the peripheral device.

7. The peripheral device of claim 5, responsive to receiving the access request, the processing device is to:
decrypt the access request using the guest cryptographic key; and
validate the access request using the device cryptographic key.

8. The peripheral device of claim 7, wherein the processing device is further to:
responsive to validating the access request, execute the access request.

9. The peripheral device of claim 7, wherein the processing device is further to:
responsive to failing validation of the access request, transmit, to the virtualized execution environment, a validation failure, wherein the validation failure indicates that the peripheral device has been compromised.

10. The peripheral device of claim 5, wherein the device cryptographic key associated with the peripheral device is stored in a configuration space of the peripheral device.

11. The peripheral device of claim 5, wherein the virtualized execution environment is represented by one of: a virtual machine or a container.

12. A non-transitory computer readable storage medium including instructions that, when executed by a processing device, cause the processing device to:
receive, by a virtualized execution environment running on the processing device, a state measurement comprising a hash function associated with a peripheral device of the computing system;
retrieve, by the virtualized execution environment, a device cryptographic key generated by the peripheral device and stored on the peripheral device;
generate a guest cryptographic key based on applying a hash transformation to an ephemeral value;
responsive to validating the state measurement, transmit, to the peripheral device, the guest cryptographic key encrypted using the device cryptographic key; and
transmit, to the peripheral device, an access request that is cryptographically signed using at least one of: a first value derived from the device cryptographic key or a second value derived from the guest cryptographic key and encrypted using a third value derived from the guest cryptographic key.

13. The non-transitory computer readable storage medium of claim 12, wherein, to validate the state measurement, the instructions cause the processing device to:
verify that the state measurement has not been compromised using the device cryptographic key; and
compare the state measurement with an expected state measurement.

14. The non-transitory computer readable storage medium of claim 12, wherein the ephemeral value is a short-term value that is generated in response to validating the state measurement.

15. The non-transitory computer readable storage medium of claim 12, wherein the virtualized execution environment is represented by one of: a virtual machine or a container.

* * * * *